US011190709B2

(12) United States Patent
Woodman et al.

(10) Patent No.: US 11,190,709 B2
(45) Date of Patent: *Nov. 30, 2021

(54) CONVERSION BETWEEN ASPECT RATIOS IN CAMERA

(71) Applicant: GoPro, Inc., San Mateo, CA (US)

(72) Inventors: Nicholas D. Woodman, Big Sky, MT (US); Sumit Chawla, San Carlos, CA (US); Loic Segapelli, Oakland, CA (US); Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,923

(22) Filed: Oct. 21, 2020

(65) Prior Publication Data
US 2021/0037194 A1 Feb. 4, 2021

Related U.S. Application Data

(63) Continuation of application No. 16/456,613, filed on Jun. 28, 2019, now Pat. No. 10,819,918, which is a (Continued)

(51) Int. Cl.
*H04N 5/262* (2006.01)
*H04N 5/232* (2006.01)
(Continued)

(52) U.S. Cl.
CPC ......... *H04N 5/2628* (2013.01); *G06T 3/0093* (2013.01); *G06T 3/4069* (2013.01);
(Continued)

(58) Field of Classification Search
CPC .............. H04N 5/2628; H04N 7/0122; H04N 21/234372; H04N 5/23229;
(Continued)

(56) References Cited

U.S. PATENT DOCUMENTS 5,657,082 A * 8/1997 Harada .............. H04N 9/04515
348/262
5,790,696 A 8/1998 Takahashi
(Continued)

FOREIGN PATENT DOCUMENTS

EP 2334058 9/2016
WO 2010073192 7/2010

OTHER PUBLICATIONS

PCT International Search Report and Written Opinion for PCT/US14/51750, dated Sep. 9, 2014, 9 pages.
(Continued)

*Primary Examiner* — Padma Haliyur
(74) *Attorney, Agent, or Firm* — Esplin & Associates, PC

(57) ABSTRACT

A camera system captures an image in a source aspect ratio and applies a transformation to the input image to scale and warp the input image to generate an output image having a target aspect ratio different than the source aspect ratio. The output image has the same field of view as the input image, maintains image resolution, and limits distortion to levels that do not substantially affect the viewing experience. In one embodiment, the output image is non-linearly warped relative to the input image such that a distortion in the output image relative to the input image is greater in a corner region of the output image than a center region of the output image.

18 Claims, 6 Drawing Sheets

Original Image (4:3)
402

Cropped Image (16:9)
404

Non-Linear Warped Image (16:9)
406

Related U.S. Application Data continuation of application No. 16/023,675, filed on Jun. 29, 2018, now Pat. No. 10,368,013, which is a continuation of application No. 15/492,738, filed on Apr. 20, 2017, now Pat. No. 10,015,413, which is a continuation of application No. 15/011,253, filed on Jan. 29, 2016, now Pat. No. 9,674,429, which is a continuation of application No. 14/536,315, filed on Nov. 7, 2014, now Pat. No. 9,294,671, which is a continuation of application No. 14/180,887, filed on Feb. 14, 2014, now Pat. No. 8,917,329.

(60) Provisional application No. 61/869,029, filed on Aug. 22, 2013.

(51) Int. Cl.
| | |
|---|---|
| *G09G 5/00* | (2006.01) |
| *H04N 21/2343* | (2011.01) |
| *H04N 7/01* | (2006.01) |
| *G06T 3/00* | (2006.01) |
| *G06T 3/40* | (2006.01) |
| *H04N 21/4402* | (2011.01) |
| *G06T 3/20* | (2006.01) |

(52) U.S. Cl.
CPC ......... *G09G 5/005* (2013.01); *H04N 5/23229* (2013.01); *H04N 7/0122* (2013.01); *H04N 21/234372* (2013.01); *G06T 3/20* (2013.01); *G06T 3/40* (2013.01); *G06T 3/4084* (2013.01); *G09G 2340/0442* (2013.01); *H04N 21/440272* (2013.01)

(58) Field of Classification Search
CPC .......... H04N 21/440272; G09G 5/005; G09G 2340/0442; G06T 3/0093; G06T 3/4069; G06T 3/20; G06T 3/40; G06T 3/4084
See application file for complete search history.

(56) References Cited

U.S. PATENT DOCUMENTS

| | | | |
|---|---|---|---|
| 6,757,446 B1 | 6/2004 | Li | |
| 6,900,821 B2 | 5/2005 | Goertzen | |
| 6,915,026 B2 | 7/2005 | Sasai | |
| 7,079,157 B2 | 7/2006 | Deering | |
| 7,483,080 B2 | 1/2009 | Arora | |
| 7,496,243 B2 | 2/2009 | Oosawa | |
| 8,045,788 B2 | 10/2011 | Watkins | |
| 8,139,884 B2 | 3/2012 | Chien | |
| 8,145,013 B1 | 3/2012 | Sahu | |
| 8,218,895 B1 | 7/2012 | Gleicher | |
| 8,340,453 B1 | 12/2012 | Chen | |
| 8,493,459 B2 | 7/2013 | Albu | |
| 8,525,871 B2 | 9/2013 | Agarwala | |
| 8,723,959 B2 | 5/2014 | Corcoran | |
| 8,786,788 B2* | 7/2014 | Jaynes | H04N 9/3185 348/747 |
| 8,913,141 B2 | 12/2014 | Campbell | |
| 9,196,228 B2 | 11/2015 | Kim | |
| 9,253,474 B2 | 2/2016 | Rui | |
| 9,787,960 B2 | 10/2017 | Sumiyoshi | |
| 2004/0017492 A1 | 1/2004 | Stavely | |
| 2005/0093893 A1* | 5/2005 | Senior | G06T 3/0012 345/660 |
| 2008/0260290 A1 | 10/2008 | Velthoven | |
| 2009/0202177 A1 | 8/2009 | Jeffrey | |
| 2010/0149216 A1* | 6/2010 | Dutta | G06T 1/00 345/660 |
| 2013/0141593 A1 | 6/2013 | Bassi | |
| 2014/0032406 A1 | 1/2014 | Roach | |
| 2016/0173767 A1 | 6/2016 | Woodman | |

OTHER PUBLICATIONS

United States Office Action for U.S. Appl. No. 14/180,887, dated May 28, 2014, 10 pages.
Office Action for U.S. Appl. No. 14/536,315 dated Jun. 19, 2015, 5 pages.
Wang, Yu-Shuen, et al., "Optimized Scale-and-Stretch for Image Resizing", ACM Transactions on Graphics (TOG), ACM, vol. 27, No. 5, Article 118, Dec. 1, 2008, XP002609797, 8 pages.
Hwang, Daw-Sen, et al., "Content-Aware Image Resizing Using Perceptual Seam Carving with Human Attention Model", International Conference on Multimedia and Expo, 2008 IEEE, Piscataway, NJ, Jun. 23, 2008, XP032965469, pp. 1029-1032.
Avidan, S., et al., "Seam Carving for Content-Aware Image Resizing", ACM Transactions on Graphics (TOG), ACM, vol. 26, No. 3, Article 10, Jul. 1, 2007, XP007904203, 10 pages.

* cited by examiner

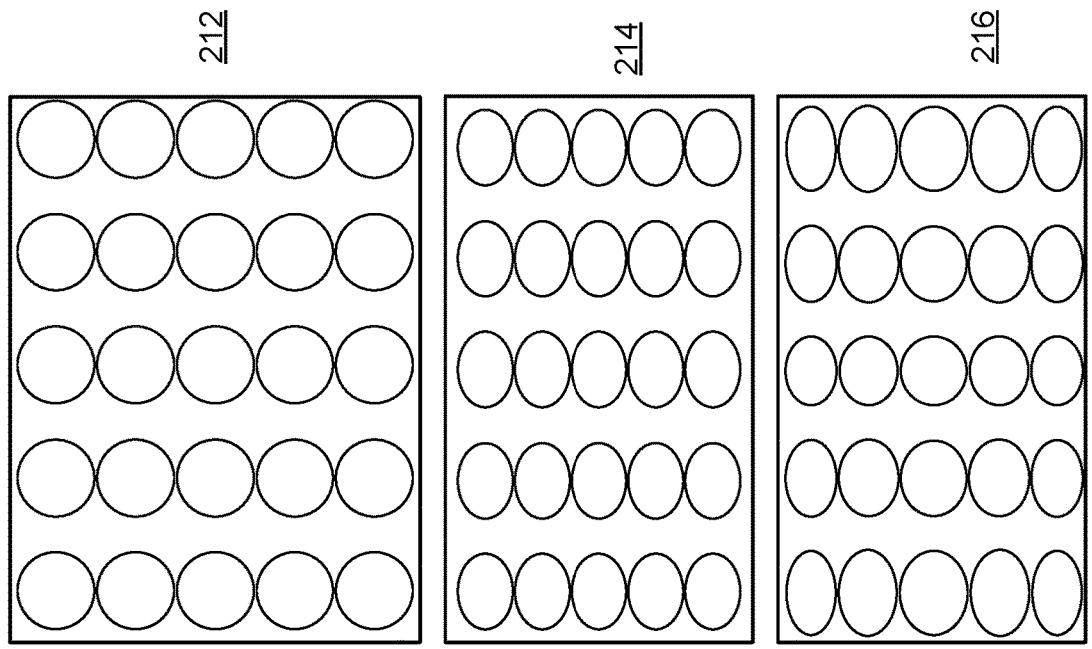
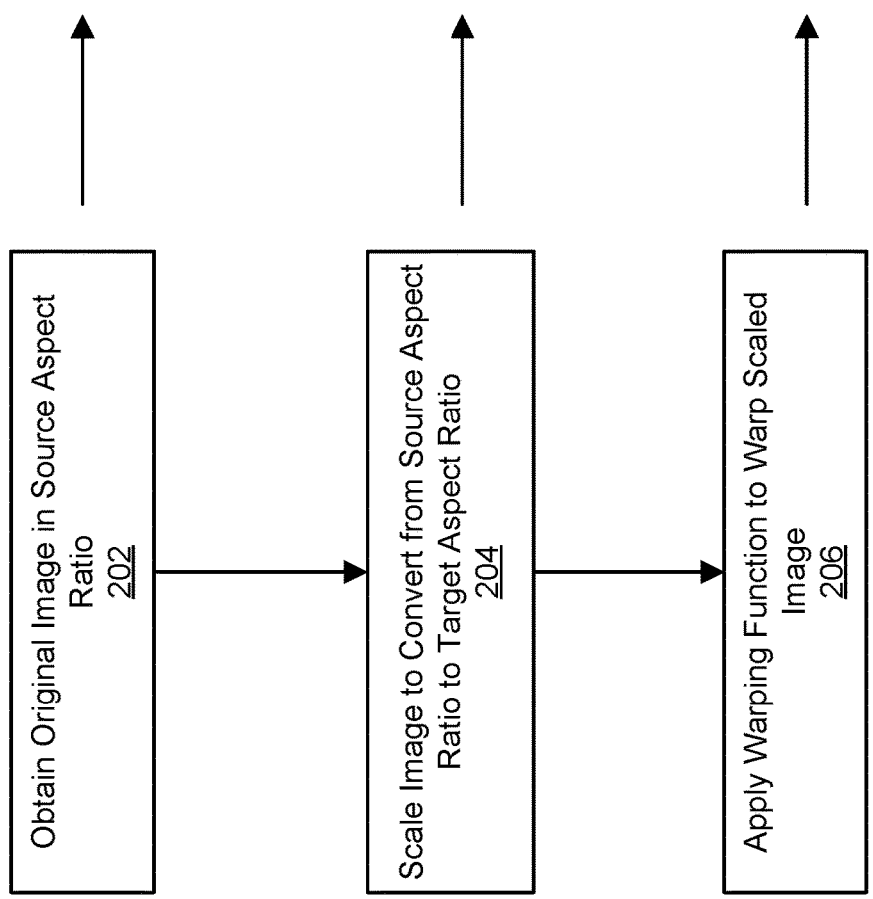
FIG. 2B
FIG. 2A

CONVERSION BETWEEN ASPECT RATIOS IN CAMERA

BACKGROUND

Converting between aspect ratios is a common problem in the field of image and video processing. For example, a display that displays images according to a 16:9 aspect ratio may receive images natively captured according to a 4:3 aspect ratio and perform an aspect ratio conversion to fit the image to the display. Conventional conversion techniques such as cropping, linearly scaling, and padding each result in a perceivable reduction in the quality of the image or video. For example, cropping removes content from the image and reduces the field of view of the image. Linear scaling maintains the full field of view but introduces perceivable distortion into the image. For example, if an image is vertically compressed and/or horizontally stretched to convert from a 4:3 to a 16:9 aspect ratio, features in scene will appear "short and fat" relative to the original image. Padding maintains the full field of view without distortion, but results in unused display space around the sides and/or top of the image, thus rendering an image that appears too small relative to the display.

BRIEF DESCRIPTION OF THE DRAWINGS

FIG. 2A is a flowchart illustrating an embodiment of a process for converting an image from a source aspect ratio to a target aspect ratio.

FIG. 2B is set of example images being converted from a source aspect ratio to a target aspect ratio.

DETAILED DESCRIPTION

Figure 1:
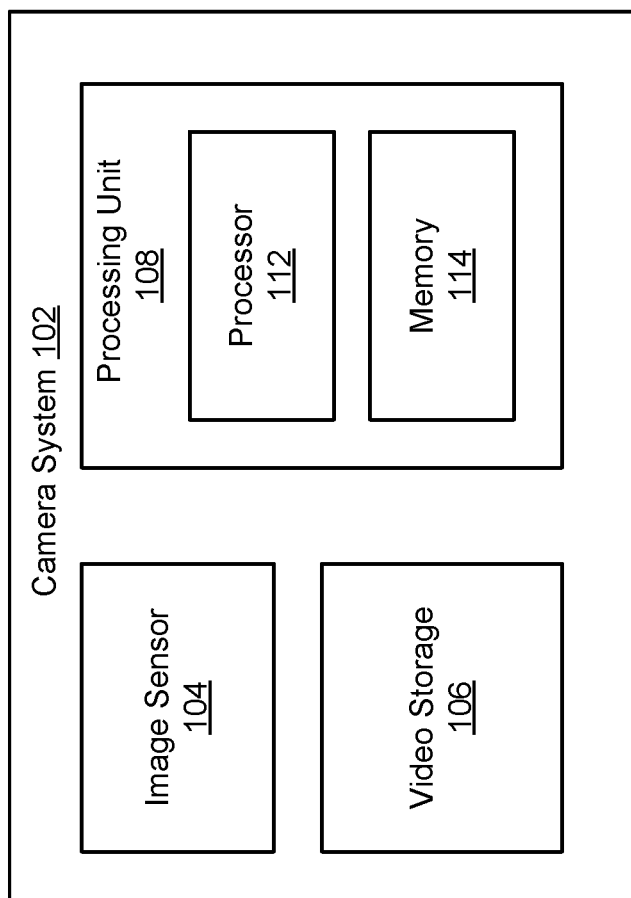
FIG. 1 is a block diagram illustrating an embodiment of a camera system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

OVERVIEW

A camera system comprises an image sensor, a processor, and a non-transitory computer-readable storage medium that stores instructions executable by the processor. The image sensor captures an input image having a source aspect ratio. The processor applies a transformation to the input image to scale and warp the image to generate an output image having a target aspect ratio different than the source aspect ratio. The output image has the same field of view as the input image, maintains image resolution, and limits distortion to levels that do not substantially affect the viewing experience. In one embodiment, the output image is non-linearly warped relative to the input image such that a distortion in the output image relative to the input image is greater in a corner region of the output image than a center region of the output image. The processor outputs the output image having the target aspect ratio.

In one embodiment, the aspect ratio conversion is performed directly on the camera itself rather than in an external post-processing device, such as the display device. This enables the camera to output images directly to a display in the desired target aspect ratio without requiring conversion by the display device. For example, a camera that natively captures images according to a 4:3 aspect ratio can perform conversion and output the images according to a 16:9 aspect ratio that may be displayed directly on a 16:9 display device. Furthermore, in one embodiment, the conversion may occur in substantially real-time such that images captured in the source aspect ratio can be outputted in the target aspect ratio with substantially no delay.

Beneficially, since the aspect ratio conversion preserves the entire field of view of the image, the converted image can be reverted back to its original aspect ratio without any loss of field of view or resolution. Furthermore, since the aspect ratio discrepancy is handled by the camera system, the end user needs not to make any additional adjustments apart from selecting the desired output video format on the camera. The embodiments described herein may apply to both individual images and video (which comprises a sequence of images (or "frames").

Example Camera System

FIG. 1 illustrates an embodiment of an example camera system 102. The camera system 102 comprises an image sensor 104, video storage 106, and a processing unit 108. Other optional components of the camera system 102 such as control interfaces, display screen, etc. are omitted from the figure for clarity of description. The image sensor 104 captures digital images or video. Because video comprises a sequence of images (or "frames"), description herein referring to images can be similarly applied to video and vice versa. Each captured image comprises a two-dimensional array of pixels. The captured frames depict a "scene," which may include, for example, landscape, people, objects, etc represented by the captured pixels. Each pixel represents a depicted point in a scene captured in the digital video. Furthermore, each pixel is located at a pixel location, referring to, for example, (x,y) coordinates of the pixel within the frame. For example, a pixel may comprise {Red, Green, Blue} (RGB) values describing the relative intensities of the colors sensed by the image sensor 104 at a particular set of (x,y) coordinates in the frame. In various embodiments, the image sensor 104 may capture video suitable for providing output videos having high definition resolutions (for example, 4k resolution, 2k resolution, 1080p, 1080i, 960p, or 720p), standard definition resolutions, or other resolutions. The image sensor 104 may capture video at various frame rates such as, for example, 120 frames per seconds (FPS), 60 fps, 48, fps, or 30 fps, although other frame rates may also be used. Additionally, the image sensor 104 may include a lens that allows for wide-angle or ultra wide-angle video capture having fields of view of, for example, 90 degrees, 127 degrees, or 170 degrees, although other field of view angles may also be used.

Image frames captured by the image sensor 102 may be temporarily or permanently stored in the video storage 106 which may comprise, for example, a hard drive or a solid-state memory device (e.g., a memory card or universal serial bus (USB) memory device). The processing unit 108 processes images to convert between aspect ratios as will be described in further detail below. In one embodiment, the processing unit 108 comprises a processor 112 and a memory 114. The memory 114 comprises a non-transitory computer-readable storage medium that stores computer-executable program instructions for aspect ratio conversion, among other functions. To perform the aspect ratio conversion described herein, the processor 112 loads program instructions from the memory 114 and executes the instructions. Alternatively, the processing unit 108 could implement the aspect ratio conversion in hardware, firmware, or a combination of hardware, firmware, and/or software.

In one embodiment, the processing unit 108 converts between a source aspect ratio (i.e., the aspect ratio of the original images captured by the image sensor 104) and a target aspect ratio (i.e., the aspect ratio of the image for storing or outputting by the camera system 102). In one embodiment, the source aspect ratio makes full use of the available field of view of the image sensor 104 (remaining sensitive to mapping distortion effects). For example, in a camera system 102 having a 4:3 image sensor, the image sensor 104 captures the native content according to a 4:3 aspect ratio, although other source aspect ratios are also possible. The processing unit 108 then uses resolution compression and/or stretching in the appropriate axes to convert the captured images in the source aspect ratio to the target aspect ratio. In one embodiment, the conversion is achieved using a resolution remapping that applies a non-linear function across the image so as to minimize or reduce undesirable key feature aspect ratio distortions. Furthermore, in one embodiment, the aspect ratio conversion does not result in any loss of field of view.

In one embodiment, the aspect ratio conversion is performed by a warp module of the processing unit 108. In addition to performing the aspect ratio conversion, the warp module may perform other functions such as, for example, reducing optical lens distortions such as typical barrel and pincushion distortions.

Aspect Ratio Conversion

Examples of techniques for aspect ratio conversion are discussed in further detail below. For the sake of clarity, the following description discusses examples involving conversions between a source aspect ratio of 4:3 and a target aspect ratio of 16:9. However, the described embodiments similarly apply to any source or target aspect ratios.

FIG. 2A illustrates an example embodiment of a process for converting from a source aspect ratio to a target aspect ratio in a camera system. In the process of FIG. 2A, an input image is obtained 202 in the source aspect ratio (e.g., a 4:3 aspect ratio). The image is then scaled 204 from the source aspect ratio (e.g., the 4:3 aspect ratio) to the target aspect ratio (e.g., a 16:9 aspect ratio) using a linear scaling function. A non-linear warping is then applied 206 to the scaled image. FIG. 2B illustrates the process of FIG. 2A as applied to an example image 212 containing an array of circles. As can be seen, the scaling function applied in step 204 causes the circles to be stretched horizontally and compressed vertically as shown in example image 214. Because the scaling function applied in step 204 is linear, each circle is stretched/compressed equally independent of horizontal and vertical position. In the warping step 206, a non-linear warping is applied which results in the circles being stretched/compressed by different amounts depending on their horizontal and vertical positions resulting in example image 216.

As can also be observed from FIG. 2B, the scaling and warping steps 204, 206 preserves the full field of view in the resulting image 216 relative to the original image 212. To achieve this, the warp module is configured so that some areas of the image are fully corrected geometrically, while some other areas are distorted. In the illustrated example, the center of the image is chosen to be the region of interest that is most fully corrected and the distortion increases in each direction as the frame boundary is approached. Thus, in image 216, the center circle is fully corrected so that it maintains the original circular shape of the corresponding circle in the input image 212. In the vertical direction, the circles become more distorted (e.g., more vertically compressed) in the as they approach the top and bottom edges. In the horizontal direction, the circles become more distorted (e.g., more horizontally stretched) as they approach the left and right edges. As a result, the circles in the corners exhibit the most distortion, because they have the highest amount of both vertical compression and horizontal stretching. In other embodiments, a different part of the image may be selected as the area most fully corrected, or in the case, of video, the area may dynamically change between images (e.g., to follow a moving object).

The distribution of distortion levels in different portions of the image may furthermore be tuned in one embodiment to control the size of objects as they pan from horizontally within a scene of video. Fully correcting the geometrical distortion in the center of the image would result in objects looking small in the center and very large on the sides. Thus, in the case of a video, an object may noticeably grow in size as it moves from the center to the edges of the display. In one embodiment, the warping function in step 206 is tuned to reduce this effect.

In an alternative embodiment, the scaling and warping functions applied in steps 204, 206 could be performed in reverse order, such that the warping function in step 206 is applied first followed by scaling in step 204. In another embodiment, the scaling and warping are combined into a single function such that only a single transformation is applied to the image that achieves both the scaling and warping. For example, in FIG. 2B, image 212 may be converted directly to image 216 via a single function without producing the intermediate image 214.

As will be apparent to those skilled in the art, an equitable horizontal remapping can be performed in manners similar to those described herein for vertical remapping if it is desired to decrease image width without decreasing horizontal image field of view and without creating undesirable key feature distortions. For example, images having a source aspect ratio of 2.39:1 may be converted to a 16:9 aspect ratio in this similar manner.

The scaling step (e.g., step 204 of FIG. 2A) may be achieved either by scaling down one dimension (either the horizontal or vertical one, depending on the formats being converted) or scaling up the orthogonal direction. Scaling up has the benefit of preserving one dimension and only interpolates existing information to extend the other dimension, meaning all resolution is preserved. On the contrary, scaling down causes a loss of information.

Figure 3:
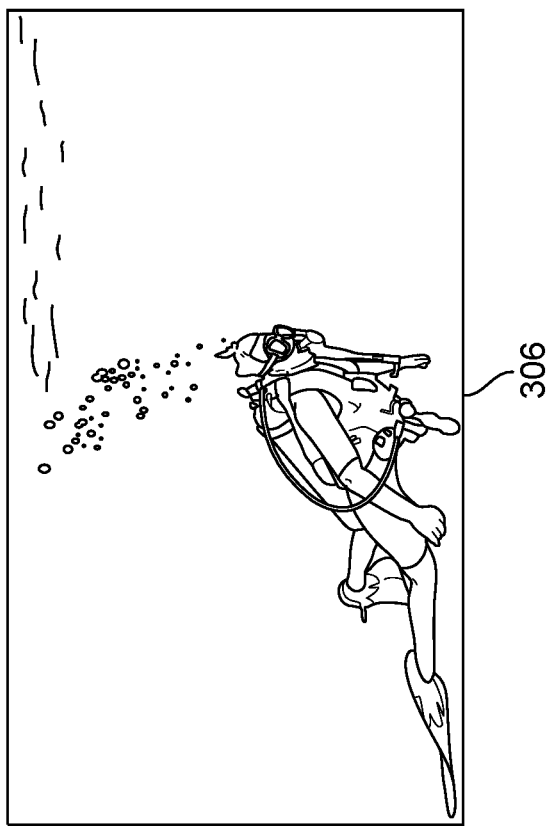
FIG. 3 is a first set of example images showing an original image in a source aspect ratio, a cropped image converted to a target aspect ratio using a cropping technique, and a non-linear warped image converted to the target aspect ratio using a non-linear warping technique.
Figure 3:
Figure 3:
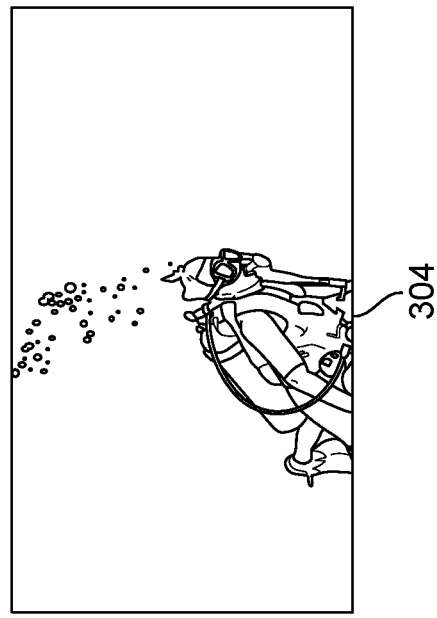

FIG. 3 illustrates example images illustrating the aspect ratio conversion technique described herein. Image 302 illustrates an original image captured with a 4:3 aspect ratio. Image 304 illustrates a conventional cropping of the image to fit it to a 16:9 aspect ratio. As can be seen, the field of view is reduced with this technique and a portion of the image is lost. Image 306 illustrates the original image converted according to the techniques described herein. As can be seen, the aspect ratio conversion is achieved while maintaining the full field of view. Although some distortion may be introduced, the distortion is concentrated near the boundaries of the image (away from the center) and perceivable distortion is limited to an acceptable level.

Figure 4:
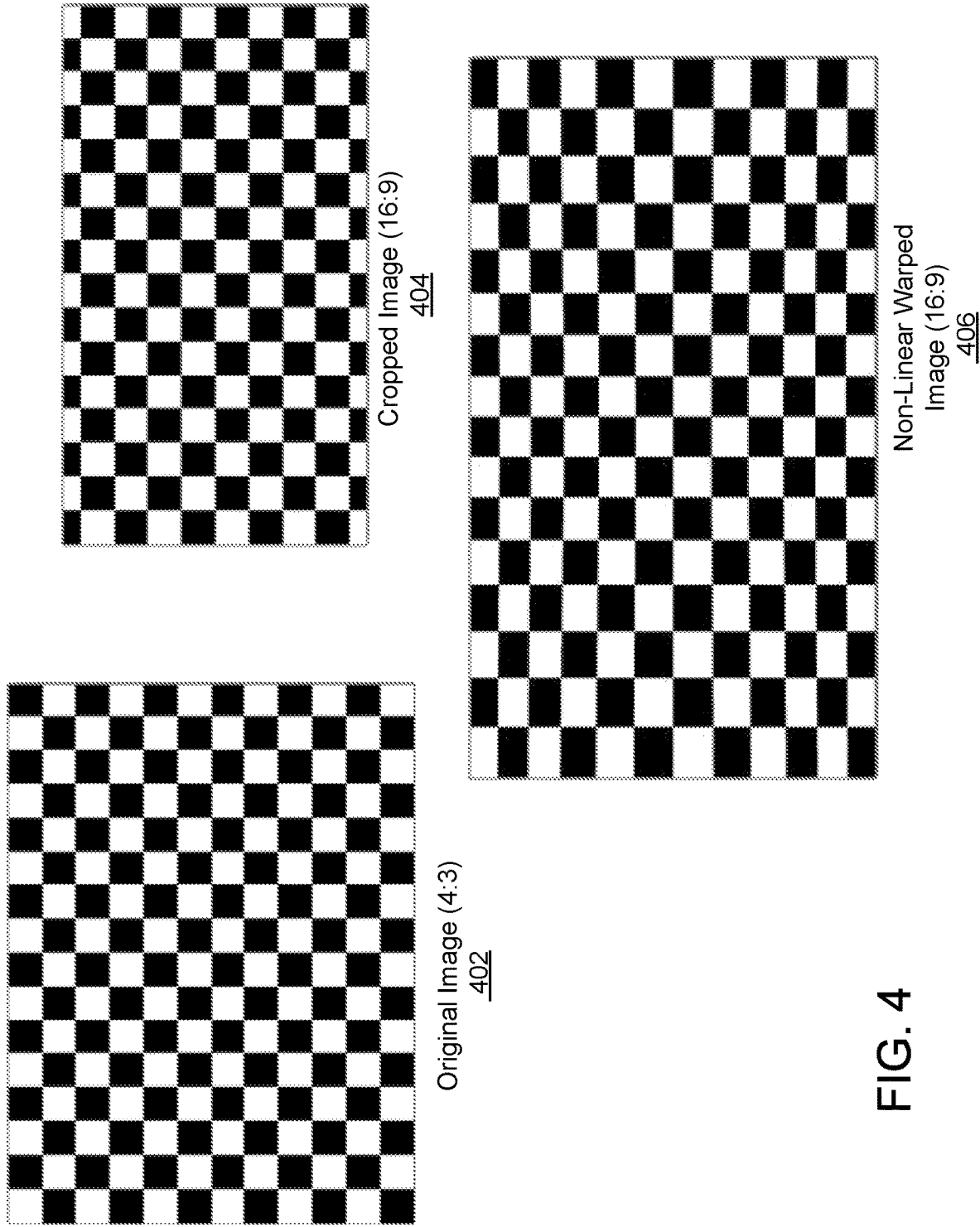
FIG. 4 is a second set of example images showing an original image in a source aspect ratio, a cropped image converted to a target aspect ratio using a cropping technique, and a non-linear warped image converted to the target aspect ratio using a non-linear warping technique.

FIG. 4 illustrates additional example images representing a checkerboard pattern, where image 502 represent an original 4:3 image, image 504 represents an image that has been cropped to achieve the 16:9 aspect ratio, and image 506 illustrates an image converted according to the techniques described herein. As can be seen, the perceivable distortion is small or zero near the center of image and increases somewhat at the edges and corners.

Examples of Warping Functions

In one embodiment, the warping function involves both a horizontal and vertical warping. For convenience of description, the horizontal and vertical warping is described as two steps, e.g., first horizontal then vertical. However, both horizontal and vertical warping can be executed in one step, for example, by applying a single transformation to the image. Furthermore, due to the symmetrical nature of the distortion, vertical and horizontal distortion profiles can be swapped.

Figure 5:
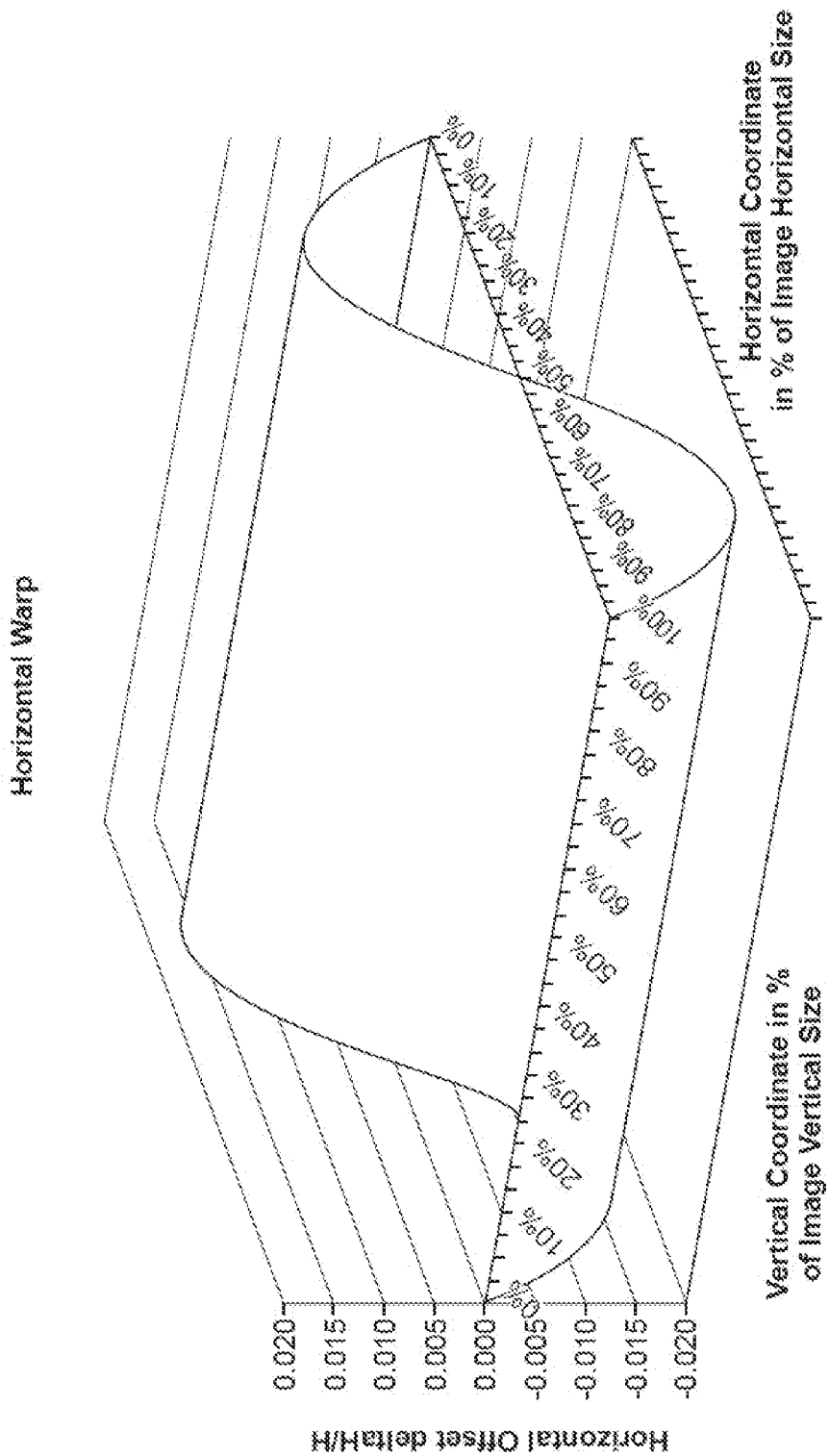
FIG. 5 is a graph illustrating an embodiment of a function for applying a horizontal warp to an image.

An example of a horizontal warping function is illustrated in FIG. 5. In this graph, the horizontal coordinate of a pixel is expressed as a percentage of the horizontal pixel position relative to the horizontal width of the image, where the percentage increases in a direction away from a reference edge. The vertical coordinate is similarly expressed. The amount of distortion is expressed in terms of the horizontal distortion offset $\Delta H$ that a point in the image moves in a direction away from the reference edge divided by the horizontal image size H. Since the warping function is horizontally symmetric in this embodiment, the reference edge can be either the right edge or the left edge. In this embodiment, the horizontal warp is function of the horizontal coordinate only and is independent of vertical position. The horizontal warp distortion stretches pixels horizontally in a manner that corrects for the "short and fat" effect introduced by 4:3 to 16:9 stretching, or similarly undesirable effects introduced by other aspect ratio conversions. In one embodiment of the horizontal warp, pixels along vertical edges are not offset (the offset value is zero) because there is no information beyond the edges and it may be undesirable to introduce padding (e.g., black vertical lines) on the sides of the image. The magnitude of the distortion is symmetric in one embodiment, with pixels on the left half of the image shifting to the right and pixels on the right half of the image shifting to the left to compensate for the horizontal stretching effect. Since the center receives the contributions of pixels from both sides, the center region of the image is corrected the most, while the geometry on the sides is distorted to a small extent. This degradation in image quality along the sides can be compensated for to some extent in the vertical warping, as will be discussed below.

In one embodiment, the amount of horizontal correction applied can be manually tuned to reduce perceivable distortion in the output image. For example, fully correcting the geometrical distortion in the center may cause the objects in the center to be much smaller than on the sides. Thus, in one embodiment, the amount of horizontal correction can be tuned in combination with the vertical correction in order to preserve the width of objects throughout the horizontal plane.

Figure 6:
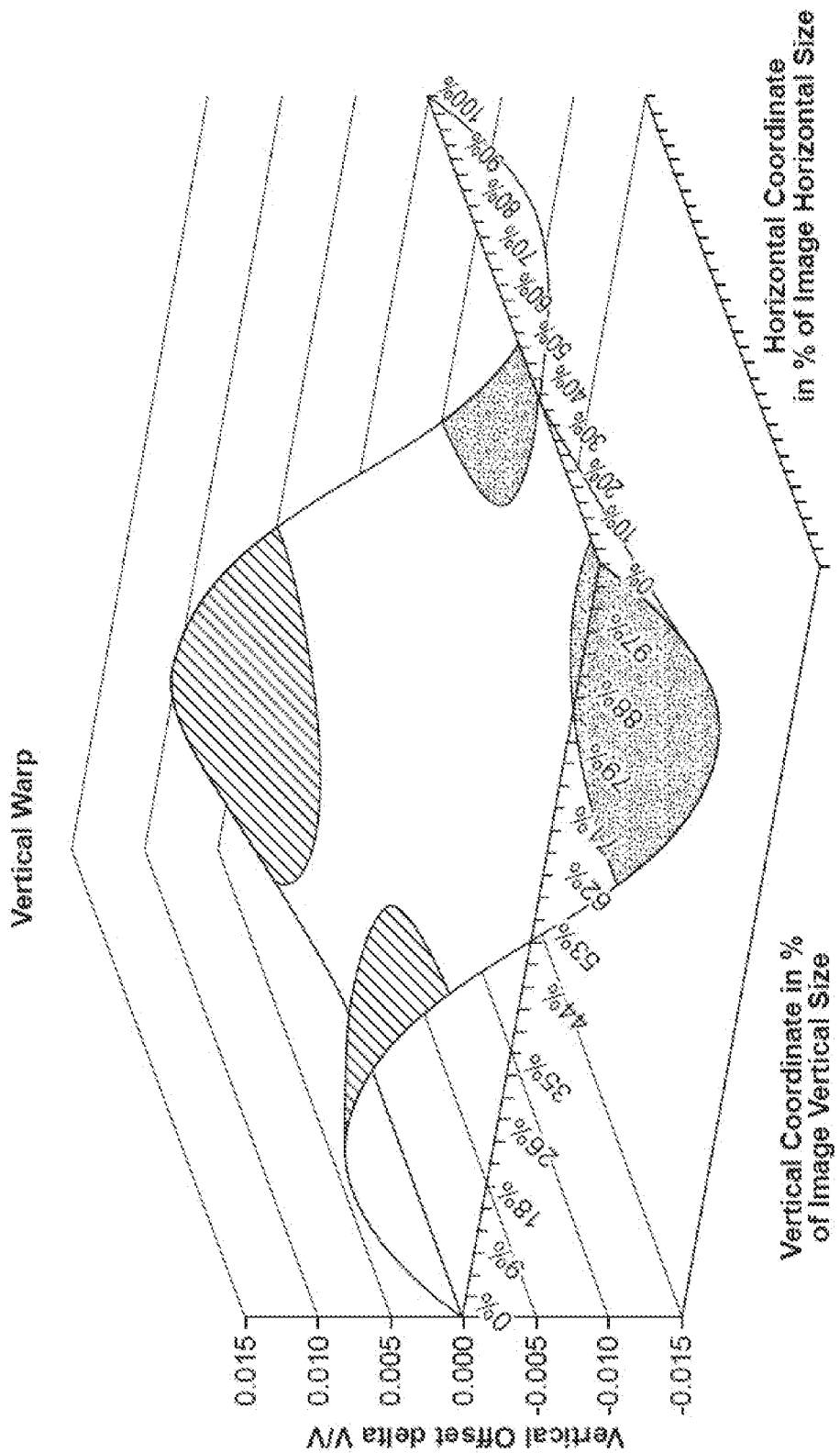
FIG. 6 is a graph illustrating an embodiment of a function for applying a vertical warp to an image.

In one embodiment, a similarly shaped function is used for vertical warping. In another embodiment, the vertical warping function is modified so that the amount of compensation in the vertical direction also depends on horizontal position. FIG. 6 illustrates an example of a vertical warping function, where the amount of distortion is express in terms of the vertical distortion offset $\Delta V$ indicating an amount that a pixel moves in a vertical direction away from a reference edge (e.g., the top edge or the bottom edge) divided by the vertical image size V. In one embodiment, vertical warping is a function of both the horizontal and vertical coordinates.

As mentioned above, a goal of the vertical distortion is to further correct the geometry that was not already corrected by horizontal distortion. The image center could be fully corrected using the horizontal distortion only (with no vertical warping). However, spreading the correction along both horizontal and vertical axis effectively improves the geometry of not only the center, but also the top, bottom, left and right image sides. The most distorted regions in this embodiment are the four image corners, but this distortion does not substantially reduce perceived image quality. Having residual distortion in the corners while correcting the rest in the image results in a much more natural-looking effect since key scene features are usually not framed in the corners. Examples of this effect can be visible, however, in FIG. 4, where the squares in the corners are more rectangular (as opposed to square), and FIG. 3 where the diver's right flipper is somewhat stretched. However, as a good trade off for these corner distortions, it can be observed that the central rows of squares in FIG. 4 maintain a relatively consistent width throughout the image. Furthermore, the diver's body in FIG. 3 has proportions that are relatively preserved across the image width.

In one embodiment, tunable parameters can be controlled to adjust the vertical distortion along both horizontal and vertical directions, resulting in the 3D-wave in FIG. 6. In one embodiment, pixels are not offset along the horizontal edges to avoid introducing horizontal padding (e.g., black bands along the edges).

In the description above, the horizontal and vertical distortions have been decoupled for the sake of clarity. However, both distortions could be implemented in a single step. Similarly, in the description above, the aspect ratio conversion (4:3 to 16:9 in this example) has been decoupled from warp distortion, but these could also be combined into a single step.

Example equations are provided below for implementing an example warping function applied in step 206 of FIG. 2. Those of ordinary skill in the art will understand that variations of these equations may also be used, and other implementations may apply that result in functions having substantially similar characteristics.

As explained above, the horizontal warp distortion in one embodiment is a function of the horizontal position only. It can therefore be represented in terms of a horizontal coordinate h in an equation such as the example equation below, or an equation substantially similar to the equation below:

$$\Delta h/H = 0.1107h^6 + 0.534h^5 - 1.7813h^4 + 1.3167h^3 - 0.0722h^2 - 0.1073h$$

The vertical warp distortion, in one embodiment, is a function of both the horizontal and vertical positions. Therefore, the vertical warp distortion can be represented as a family of equations $\Delta V/V_n$, where "n" is the horizontal coordinate expressed as a percent of the total horizontal image size. Intermediate horizontal coordinates can be interpolated from the example equations given below, or equations substantially similar to these:

$$\Delta v/V_0 = -0.0749v^6 - 0.3167v^5 + 1.0939v^4 - 0.8113v^3 + 0.0408v^2 + 0.0678v$$

$$\Delta v/V_{10} = -0.0658v^6 - 0.2785v^5 + 0.9617v^4 - 0.7132v^3 + 0.0359v^2 + 0.0596v$$

$$\Delta v/V_{20} = -0.0568v^6 - 0.2402v^5 + 0.8294v^4 - 0.6152v^3 + 0.0309v^2 + 0.0514v$$

$$\Delta v/V_{30} = -0.0444v^6 - 0.188v^5 + 0.6491v^4 - 0.4814v^3 + 0.0242v^2 + 0.0403v$$

$$\Delta v/V_{40} = -0.0337v^6 - 0.1427v^5 + 0.4928v^4 - 0.3655v^3 + 0.0184v^2 + 0.0306v$$

$$\Delta v/V_{50} = -0.0296v^6 - 0.1253v^5 + 0.4327v^4 - 0.3209v^3 + 0.0161v^2 + 0.0268v$$

$$\Delta v/V_{60} = -0.0337v^6 - 0.1427v^5 + 0.4928v^4 - 0.3655v^3 + 0.0184v^2 + 0.0306v$$

$$\Delta v/V\text{-}70 = -0.0444v^6 - 0.188v^5 + 0.6491v^4 - 0.4814v^3 + 0.0242v^2 + 0.0403v$$

$$\Delta v/V_{80} = -0.0568v^6 - 0.2402v^5 + 0.8294v^4 - 0.6152v^3 + 0.0309v^2 + 0.0514v$$

$$\Delta v/V_{90} = -0.0658v^6 - 0.2785v^5 + 0.9617v^4 - 0.7132v^3 + 0.0359v^2 + 0.0596v$$

$$\Delta v/V_{100} = -0.0749v^6 - 0.3167v^5 + 1.0939v^4 - 0.8113v^3 + 0.0408v^2 + 0.0678v$$

The warp distortion described above may be used with cameras producing either rectilinear images (without distortion) or images affected by optical lens distortion characterized by the following equation:

$$(FOV) = (21.904)*(IH) - (0.6852)*(IH)^2.$$

where FOV is the field of view and IH is image height. As will be apparent to those of ordinary skill in the art, the equations above may vary when used with lenses having different distortion characteristics.

As described above, the above equations can be combined with a scaling function to generate a transformation that performs both scaling and warping.

In alternative embodiments, different equations may be used to achieve similar distortion characteristics. As mentioned above, the symmetric nature of the distortion and the fact that it can be expressed as a percent of image coordinates allows swapping horizontal and vertical distortions. Thus, in an alternative embodiment, the equations above for the horizontal axis can instead by applied in the vertical direction and vice versa.

Furthermore, in other alternative embodiments, the equations may change dynamically in different frames of a video. For example, warping may be applied in a manner that reduces distortion applied to a particular object in motion across different frames of a video since the viewer is likely to focus attention on the object in motion.

Although the example embodiments described herein relate to conversion between a 4:3 aspect ratio and a 16:9 aspect ratio, other aspect ratios may be used for the target and source aspect ratios. For example, in alternative embodiments the source aspect ratio can comprise a 4:3 aspect ratio, a 16:9 aspect ratio, a 1.85:1 aspect ratio, a 2.39:1 aspect ratio, a 3:2 aspect ratio, a 5:3 aspect ratio, a 5:4 aspect ratio, a 1:1 aspect ratio or any other aspect ratio. Similarly, in alternative embodiments, the target aspect ratio can comprise a 4:3 aspect ratio, a 16:9 aspect ratio, a 1.85:1 aspect ratio, a 2.39:1 aspect ratio, a 3:2 aspect ratio, a 5:3 aspect ratio, a 5:4 aspect ratio, a 1:1 aspect ratio or any other aspect ratio.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An image capture apparatus, comprising:
   an image sensor configured to capture an input image having a source aspect ratio, the input image including pixels located at input positions;
   a display coupled to one or more physical processors; and
   the one or more physical processors configured to:

obtain the input image, wherein a portion of the input image includes a subset of the pixels;

generate an output image by applying a transformation to the input image without cropping or padding of the input image to preserve entire field of view of the input image within the output image, the output image having a target aspect ratio different than the source aspect ratio, the output image including the pixels located at output positions, wherein:

the transformation non-uniformly shifts the pixels from the input positions to the output positions based on distances between the input positions of the pixels and a center of the portion within the input image;

the transformation non-uniformly shifts the pixels such that less shifting occurs between the input positions and the output positions of the pixels closer to the portion than between the input positions and the output positions of others of the pixels farther from the portion, wherein the transformation results in greater geometric correction of the pixels closer to the portion than the others of the pixels and distortion increases towards boundary of the output image; and the transformation includes a scaling up that preserves a first dimension of the input image and interpolates existing information within the input image to extend a second dimension of the output image, the second dimension orthogonal to the first dimension, wherein all resolution of the input image is preserved in the output image; and present the output image on the display.

2. A system that converts between aspect ratios, the system comprising:

one or more physical processors configured to:

obtain an input image, the input image having a source aspect ratio, the input image including pixels located at input positions, wherein a portion of the input image includes a subset of the pixels; and generate an output image by applying a transformation to the input image without cropping or padding of the input image to preserve entire field of view of the input image within the output image, the output image having a target aspect ratio different than the source aspect ratio, the output image including the pixels located at output positions, wherein:

the transformation non-uniformly shifts the pixels from the input positions to the output positions based on distances between the input positions of the pixels and a center of the portion within the input image;

the transformation non-uniformly shifts the pixels such that less shifting occurs between the input positions and the output positions of the pixels closer to the portion than between the input positions and the output positions of others of the pixels farther from the portion, wherein the transformation results in greater geometric correction of the pixels closer to the portion than the others of the pixels and distortion increases towards boundary of the output image; and the transformation includes a scaling up that preserves a first dimension of the input image and interpolates existing information within the input image to extend a second dimension of the output image, the second dimension orthogonal to the first dimension, wherein all resolution of the input image is preserved in the output image.

3. The system of claim 2, wherein the transformation includes:

a scaling function to uniformly stretch or compress the input image along a first axis; and a warping function to non-uniformly warp the input image along a second axis, the first axis perpendicular to the second axis.

4. The system of claim 3, wherein the scaling function changes the source aspect ratio to the target aspect ratio.

5. The system of claim 2, wherein the one or more physical processors are included within a camera.

6. The system of claim 5, wherein the output image is presented on a display of the camera.

7. The system of claim 2, wherein the portion corresponds to a center portion of the input image.

8. The system of claim 2, wherein the portion corresponds to a non-center portion of the input image.

9. The system of claim 2, wherein the distances between the input positions of the pixels and the center of the portion within the input image includes vertical distances and lateral distances between the input positions and the center of the portion.

10. The system of claim 2, wherein the portion is determined based on a location of an object within the input image such that the portion includes the object.

11. The system of claim 2, wherein the input image includes a video frame of a video.

12. The system of claim 2, wherein pixels along vertical edges of the input image are not offset in the output image.

13. The system of claim 2, wherein an amount of horizontal correction applied is tuned to reduce perceivable distortion in the output image.

14. The system of claim 13, wherein the amount of horizontal correction applied is tuned in combination with vertical correction to preserve width of objects throughout a horizontal plane.

15. The system of claim 2, wherein the subset of the pixels within the portion is corrected using horizontal distortion.

16. The system of claim 15, wherein vertical distortion is used to correct geometry not corrected by the horizontal distortion.

17. A method for converting between aspect ratios, the method performed by a computing system including one or more physical processors, the method comprising:

obtaining, by the computing system, an input image, the input image having a source aspect ratio, the input image including pixels located at input positions, wherein a portion of the input image includes a subset of the pixels; and generating, by the computing system, an output image by applying a transformation to the input image without cropping or padding of the input image to preserve entire field of view of the input image within the output image, the output image having a target aspect ratio different than the source aspect ratio, the output image including the pixels located at output positions, wherein:

the transformation non-uniformly shifts the pixels from the input positions to the output positions based on distances between the input positions of the pixels and a center of the portion within the input image;

the transformation non-uniformly shifts the pixels such that less shifting occurs between the input positions and the output positions of the pixels closer to the portion than between the input positions and the output positions of others of the pixels farther from the portion, wherein the transformation results in greater geometric correction of the pixels closer to the portion than the others of the pixels and distortion increases towards boundary of the output image; and the transformation includes a scaling up that preserves a first dimension of the input image and interpolates existing information within the input image to extend a second dimension of the output image, the second dimension orthogonal to the first dimension, wherein all resolution of the input image is preserved in the output image.

18. The method of claim 17, wherein the transformation includes:

a scaling function to uniformly stretch or compress the input image along a first axis; and a warping function to non-uniformly warp the input image along a second axis, the first axis perpendicular to the second axis.

\* \* \* \* \*